United States Patent [19]
Mollere

[11] 4,180,103
[45] Dec. 25, 1979

[54] TERMINATION FIXTURE FOR A MARINE SEISMIC STREAMER CABLE

[75] Inventor: John C. Mollere, Nassau Bay, Tex.

[73] Assignee: Western Geophysical Co. of America, Houston, Tex.

[21] Appl. No.: 940,420

[22] Filed: Sep. 7, 1978

[51] Int. Cl.² ............................................. F16L 55/00
[52] U.S. Cl. ........................................138/109; 367/20; 367/106; 367/130
[58] Field of Search .................... 138/109, 96 R, 96 T; 339/148, 104; 340/7 R, 15.5 TS; 181/0.5

[56] References Cited

U.S. PATENT DOCUMENTS

| | | | |
|---|---|---|---|
| 3,232,638 | 2/1966 | Hollander | 138/109 |
| 3,376,948 | 4/1968 | Morrow | 181/0.5 |
| 3,791,480 | 2/1974 | Clearwaters | 138/109 |
| 3,858,613 | 1/1975 | Musslewhite | 138/96 T |
| 3,914,014 | 10/1975 | James | 339/148 |
| 4,092,629 | 5/1978 | Siems et al. | 340/7 R |

FOREIGN PATENT DOCUMENTS 872393  6/1942  France ................................. 138/96 R Primary Examiner—Lenard A. Footland
Attorney, Agent, or Firm—William A. Knox

[57] ABSTRACT

A marine seismic streamer-cable section includes a plastic tubular jacket reinforced by tough, braided-fiber tapes embedded in the jacket wall. A termination fixture is fastened to each end of the cable section. The termination fixture includes a bulkhead, an untapered end of which fits snugly into the plastic jacket. The other end of the bulkhead is tapered and protrudes from the end of the jacket. Short lengths of the reinforcing tapes are exposed by stripping away some of the jacket wall. A cylindrical wedge grips the exposed tapes between the inner wall of the wedge and the tapered portion of the bulkhead. The tapes are doubled back over the outside of the wedge and are bound to the jacket and to the untapered end of the bulkhead by bands.

2 Claims, 5 Drawing Figures

TERMINATION FIXTURE FOR A MARINE SEISMIC STREAMER CABLE

BACKGROUND OF THE INVENTION

1. Technical Field of the Invention

This invention is concerned with a cable-section termination fixture for connecting together two or more seismic streamer cable sections.

2. Description of the Prior Art

In marine seismic surveying, a plurality of hydrophones are enclosed in an elongated tubular plastic jacket and are towed through the water by a ship. Electrical signals from the hydrophones are transmitted to a recording apparatus, mounted on the towing ship, through electrical conductors that are also enclosed in the plastic jacket. Since the streamer cable may be two miles or more in length, the streamer cable is divided into sections each of which is two to three hundred feet long. Termination fixtures are secured to each end of the cable sections so that the sections and the electrical conductors can be suitably coupled together.

The jacket is made of a plastic material such as polyvinyl chloride. This material stretches as much as 400% when subjected to towing tension. Accordingly, steel stress members are threaded through the jacket and are anchored to the termination fixtures at each end of a cable section.

The streamer cable must have neutral buoyancy in the water so that it will stream at a desired depth. The cable is made neutrally bouyant by filling the cable jacket with a light hydrocarbon fluid such as kerosene. It is evident that the steel stress members add weight to the cable along with the weight due to the hydrophones and electrical conductors. Thus, the number of hydrophones and conductors that can be enclosed within a cable section is limited because of the additional weight of the steel stress members. The details of conventional cable-section construction and cable-section coupling techniques are well known to the art. For example, see U.S. Pat. Nos. 3,914,014 and 4,092,629, both of which are assigned to the assignee of this invention, and U.S. Pat. No. 3,376,948.

In an effort to reduce the cable weight, it has been proposed to replace the steel stress members by lightweight tapes made by braiding together fibers of a tough plastic material such as Kevlar made by Dupont Chemical Co. The tensile strength of this material is 400,000 psi, comparable with the tensile strength of steel stress members. In use, several such tapes are embedded longitudinally in the wall of the plastic jacket at the time when the jacket is extruded. At each end of a cable section, portions of the embedded tapes are exposed by stripping away some of the jacket. The exposed portions of the tapes are then bonded to the termination fixtures by a potting compound such as epoxy cement.

Although the resulting bond is mechanically satisfactory, once the bond is made, it can never be disassembled without destroying it; the epoxy bond is a permanent bond. Because the cemented bond is permanent, it is impossible to repair a defective cable section in the field.

SUMMARY OF THE INVENTION

It is an object of this invention to provide a termination fixture for use with a plastic-tape reinforced cable-section jacket, that is readily assembled and disassembled in the field.

In one aspect of this invention, the termination fixture comprises a short cylindrical bulkhead, one end of which fits snugly into an end of a cable-section jacket. The other end of the bulkhead is smoothly tapered and protrudes from the end of the jacket. Short lengths of the reinforcing tapes are exposed by stripping away some of the jacket wall. A cylindrical wedge, having a smoothly tapered inner wall, fits over the tapered portion of the bulkhead to grip the exposed tapes between the bulkhead and the inner wall of the cylindrical wedge. The remaining lengths of the reinforcing tapes are doubled back over the outside of the cylindrical wedge and are bound to the jacket and to the bulkhead by a suitable binding means.

In another aspect of this invention, the jacket wall abuts the cylindrical wedge. The outer diameter of the cylindrical wedge is substantially the same as that of the jacket so that the entire assembly presents a smooth streamlined surface when towed through the water.

DETAILED DESCRIPTION OF THE PREFERRED EMBODIMENT

Figure 1:
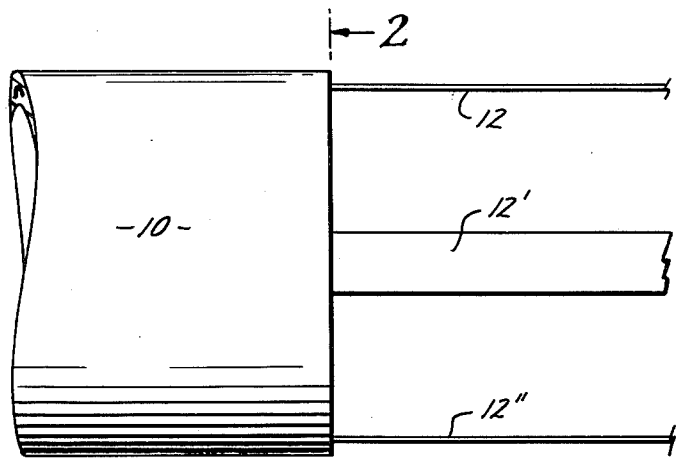
FIG. 1 is a side view of a tape-reinforced cable-section jacket showing a portion of the reinforcing tapes exposed by stripping away some of the jacket wall.
Figure 2:
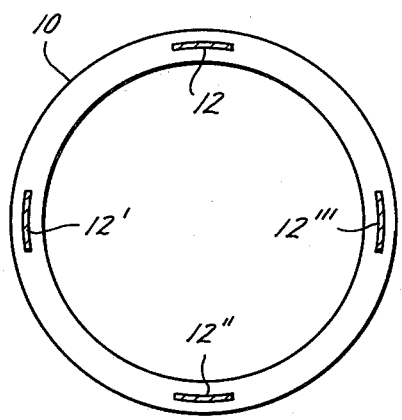
FIG. 2 is a cross-sectional view along line 2-2' of FIG. 1.
Figure 3:
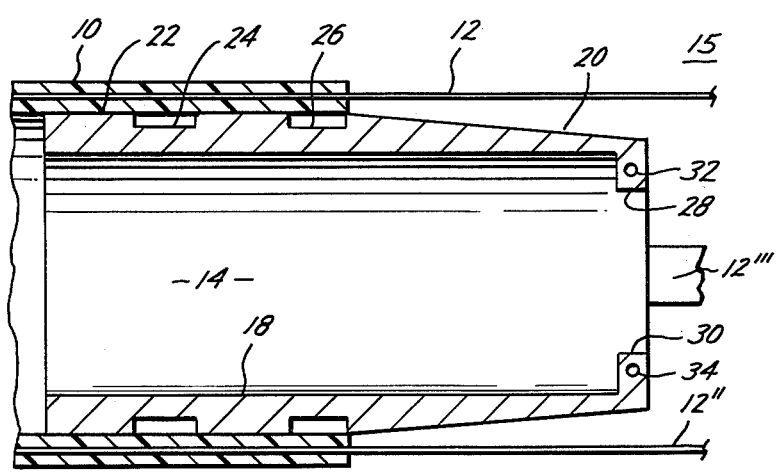
FIG. 3 is a partially exploded view of the component parts of the termination fixture.

Referring now to FIG. 1 and FIG. 2 of the drawings, there is shown a tubular cable jacket 10 having embedded in the wall thereof, a plurality of braided-fiber reinforcing tapes 12-12'''. Four such tapes are shown but more or fewer may be employed. The tapes are molded into the jacket wall during the extrusion process. In the figures, short lengths of tapes 12-12''' are shown exposed by stripping away a portion of the wall of plastic jacket 10. As pointed out earlier, the jacket may be manufactured from PVC and the reinforcing tapes are preferably braided from Kevlar fibers. This plastic material has a high tensile strength of a least 400,000 psi and has been employed in the manufacture of heavy duty truck tires among other uses.

The termination fixture generally shown as 15 consists of two parts: A bulkhead 14 and a cylindrical wedge or collar 16.

Bulkhead 14 has an inner wall and a outer wall, one portion 20 of which is inwardly tapered and has a smooth surface and the other portion 22 is untapered. The untapered portion 22 has serrations 24, 26 for firmly gripping jacket 10, as will be discussed below. The untapered portion 22 of bulkhead 14 fits snugly inside jacket 10. The term "snugly" is here used in the dictionary meaning of a snug fit, viz.: The closest fit that can be assembled by hand for parts that are not to move with respect to each other. One or more lug, 28, 30, having holes 32, 34 drilled therethrough, are provided for making a mechanical connection to an adjacent cable section. Such connections are well known to the art and may take the form of a clevis having a short cable swaged thereto such as are used for aircraft control cables. See for example U.S. Pat. No. 4,092,629 and U.S. Pat. No. 3,376,948.

Cylindrical wedge or collar 16 has an outer wall 36 and a smoothly tapered interior as represented by inner wall 38. The inner taper 38 mates with the tapered portion 20 of bulkhead 14. The taper angle is not critical, but is preferably about five to seven degrees.

Figure 4:
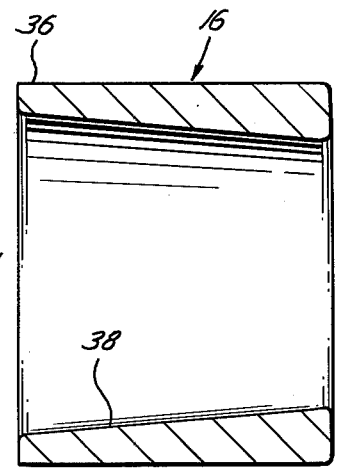
FIG. 4 is a cross section along line 4-4' of FIG. 3 showing the termination fixture after assembly.
Figure 4:
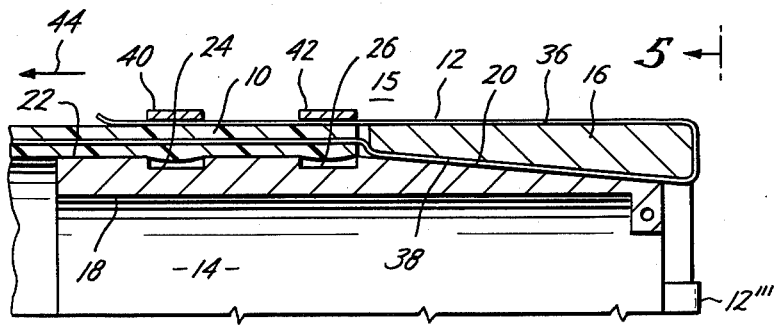
Figure 5:
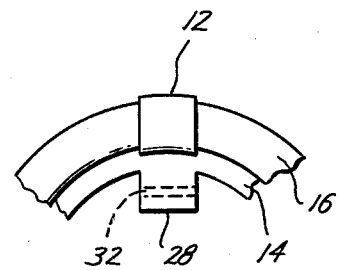
FIG. 5 is a front view of the assembled termination fixture of FIG. 4.

In use, the exposed lengths of tapes 12-12''' are gripped between the tapered portion 20 of bulkhead 14 and the tapered interior 38 of cylindrical wedge 16 when the wedge 16 is mated with bulkhead 14 as shown in FIGS. 4 and 5. The loose ends of tapes 12-12''' are doubled back over outer wall 36 of cylindrical wedge 16 and over the end of that part of jacket 10 that encircles the untapered portion 22 of bulkhead 14. The doubled back tapes are then bound firmly to the jacket 10 and bulkhead 14 by bands 40 and 42 of steel or other material. The tension of bands 40 and 42 will tend to force parts of the wall of jacket 10 to bulge into serrations 24 and 26, hereby to hold the entire assembly securely in place.

Inspection of FIG. 4 will reveal that towing tension, exerted towards the left of FIG. 4 as shown by arrow 44, will cause tape 12 to draw cylindrical wedge 16 ever more tightly against bulkhead 14, thereby creating a secure union between the cable jacket 10 and the termination fixture 15.

When it is desired to disassemble the termination fixture to make a field repair, it is a simple matter to cut away bands 40 and 42 and to dislodge cylindrical wedge 16 by tapping it with a hammer.

In order to avoid unnecessary complication of the drawings, items such an hydrophones, electrical conductors and means for interconnecting two cable sections, have not been shown. These details are well known to the seismic art. For example, see U.S. Pat. No. 3,376,948, which shows one such coupler and U.S. Pat. No. 3,914,014 which shows another type of coupler.

Variations from the design as shown in the preferred embodiment may be made without departing from the scope of this invention which is limited only by the appended claims.

I claim as my invention:

1. A termination fixture for a seismic marine streamer cable section that is to be towed underwater, said cable section being in the form of an elongated tubular plastic jacket for containing a plurality of hydrophones and electrical conductors, the jacket being reinforced along its length by a plurality of tapes braided from plastic fibers of high tensile strength that are embedded in the wall of said jacket, short lengths of said tapes being exposed by stripping away a part of the wall of the plastic jacket at an end thereof, the termination fixture comprising:

a cylindrical bulkhead having inner and outer walls, a first portion of said outer wall having a smooth inwardly tapered surface and a second portion of said outer wall being untapered, the untapered portion having a diameter to fit snugly inside an end portion of said jacket;

a cylindrical wedge for gripping the exposed lengths of said tapes between the tapered portion of said bulkhead and the interior of said cylindrical wedge;

said cylindrical wedge being a collar having an outer wall and a smoothly tapered inner wall that is mateable with the tapered outer wall portion of said bulkhead; and means for doubling back said exposed lengths of said tapes over the outer wall of said collar and means for externally binding said doubled-back tapes and the end portion of said jacket to the untapered outer wall portion of said bulkhead.

2. The termination fixture as defined in claim 1 wherein the end of said jacket abuts an end of said collar to provide a streamlined surface to the surrounding water.

* * * * *